Nov. 3, 1970    P. N. DUDENEY    3,537,796
TEMPERATURE COMPENSATED SPECTROMETER
Filed Nov. 30, 1967

INVENTOR.
PETER N. DUDENEY
BY Morse, Altman & Oates
ATTORNEYS

United States Patent Office 3,537,796
Patented Nov. 3, 1970

3,537,796
TEMPERATURE COMPENSATED SPECTROMETER
Peter N. Dudeney, Wayland, Mass., assignor to Baird-Atomic, Inc., Cambridge, Mass., a corporation of Massachusetts
Filed Nov. 30, 1967, Ser. No. 686,899
Int. Cl. G01j 3/00
U.S. Cl. 356—74
5 Claims

ABSTRACT OF THE DISCLOSURE

In an optical spectrometer a constant path length is maintained between the entrance and exit slits regardless of dimensional changes in the spectrometer housing due to changes in ambient temperature conditions. The entrance slit is mounted on a parallelogramming structure connected to a point along a lever which is pivoted to the housing. Connected to another point on the lever is a rod of a material having a very low coefficient of expansion. This rod is fixed parallel to the housing whereby, as the housing expands or contracts, it will move the lever causing it to pivot with respect to the rod. This in turn displaces the slit in one direction or another along the optical axis by a distance sufficient to maintain a constant path length between the entrance and exit slits thereby maintaining the system in focus.

BACKGROUND OF THE INVENTION

Field of the invention

This invention relates generally to optical spectrometers and more particularly is directed towards a novel arrangement for maintaining an optical spectrometer in focus regardless of expansion and contraction of the housing under changing temperature conditions.

Description of the prior art

In optical spectrometers considerable attention must be given to the effects of temperature changes on the optical system. Insofar as instruments of this type are extremely precise and sensitive any physical distortions produced by temperature changes will have adverse effects on the operating efficiency of the system. For example, a dimensional change in the housing will cause a change in the optical path length between the entrance and exit slits so that the spectral images will not be in focus at the exit slits and the output signal will be reduced. Various techniques have been employed heretofore to resolve this problem with the most common approach being to maintain the instrument in a temperature controlled room. This solution is not entirely satisfactory since it is expensive and limits the utility of the instrument. Other techniques have also been employed but none of these have been entirely satisfactory. Accordingly, it is an object of the present invention to provide a new and improved means for maintaining an optical spectrometer automatically in focus regardless of temperature conditions.

SUMMARY OF THE INVENTION

This invention features an optical spectrometer organized about a housing having an entrance slit, a diffraction grating and an array of exit slits. Focusing of the spectral components on their respective exit slits is maintained by keeping a constant path length between the entrance and exit slits. This is done by moving the entrance slit along the optical axis at exactly the same rate as the overall path length changes with temperature. The means for carrying out the entrance slit movement involves a parallelogramming entrance mount operatively connected to a lever pivoted to the housing. A rod having a low coefficient of expansion is fixed at one end to the housing and at the other end to a point on the lever, whereby expansion or contraction of the housing under changing temperature conditions will pivot the lever causing a displacement of the slit mount according to a predetermined factor.

DETAILED DESCRIPTION OF THE PREFERRED EMBODIMENT

Figure 1:
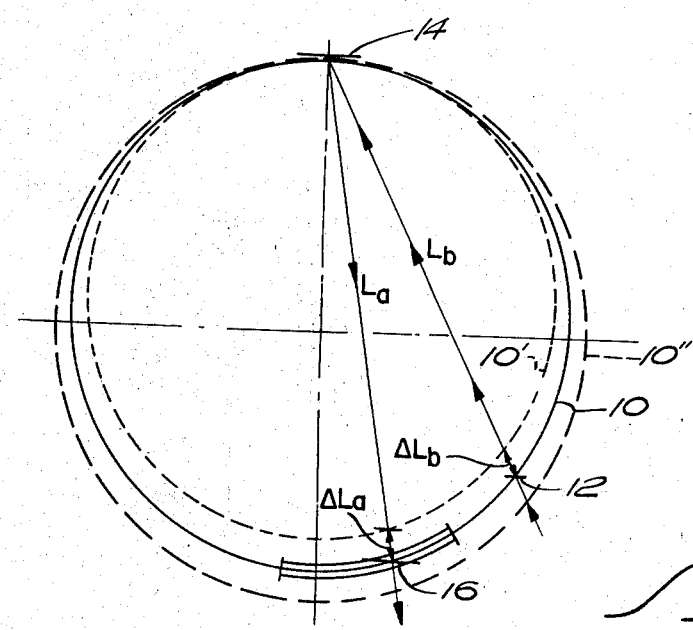
FIG. 1 is a somewhat schematic diagram of a Rowland circle shown in normal, contracted and expanded conditions.
Figure 4:
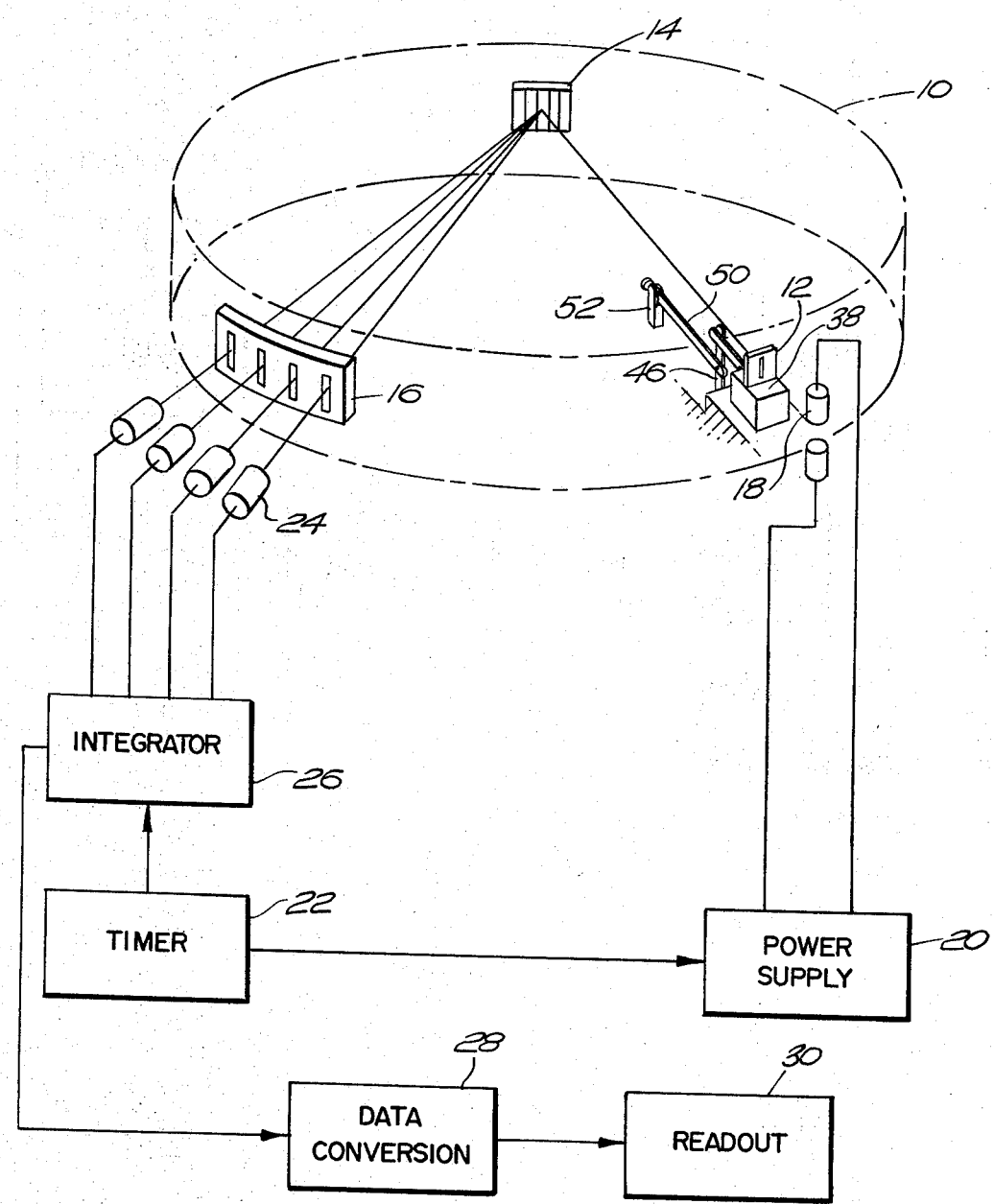

Referring now to the drawings and particularly to FIGS. 1 and 4, there is illustrated an optical spectrometer in the form of a Rowland circle, with the spectrometer housing indicated by reference character 10. The optical components for the Rowland circle include an entrance slit 12, a diffraction grating 14 and an array of exit slits 16. Typical dimensions for a Rowland circle include a diameter of 39.37″, a grating to exit slit distance $L_a$ of 39″ and a grating to entrance slit distance $L_b$ of 36″. Associated with the Rowland circle for an automatic control system is a pair of electrodes 18 for exciting a specimen aligned with the entrance slit 12. The electrodes 12 are connected to a power supply 20 which in turn is controlled by means of a timer 22. Mounted in register with the exit slits 16 are the photo cells 24 adapted to produce an output signal corresponding to the intensity of the spectral components. The photo cells are connected to integrating circuits 26 shown in box form these also being controlled by the timer 22. The integrating circuits have an output to a data conversion system generally indicated by box 28 which in turn provides an output to a readout unit 30 which presents the information in a suitable form such as puched cards, digital display, or the like.

Insofar as the primary optical components of the Rowland circle namely, the entrance slit, the grating and the exit slits, are connected together by means of the housing 10 they are subject to the effects of changing ambient temperatures. The effect of changing temperatures may be demonstrated by the following analysis with reference being made to FIG. 1. In this analysis it is assumed that the grating 14 is thermally inert. This is a valid assumption because the grating blank preferably is made of used quartz which has a thermal coefficient of expansion of $0.28 \times 10^{-6}$ inches per inch per degree Fahrenheit.

Now considering a condition where the grating 14 is fixed and only the entrance and exit slits 12 and 16 are free to move, the change in optical path length from temperature change can be expressed by the following equation.

$$\Delta L_{(a+b)} = K(L_a + L_b)\Delta t$$

Where

K=linear coefficient expansion,
$\Delta t$=temperature change,
$L_a$=distance from grating to exit slit,
$L_b$=distance from entrance slit to grating.

Now if the optical head is machined and aligned at 80° Fahrenheit the maximum temperature change in either direction is 50° F. and with $L_a=39''$ and $L_b=36''$ and using $11.5 \times 10^{-6}$ inches per degrees F.

Figure 2:
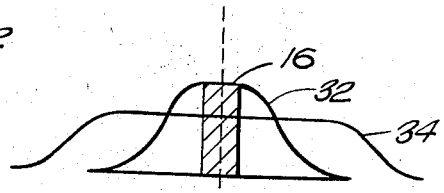
FIG. 2 is a somewhat schematic view showing the focusing of a spectral beam on an exit slit.

$L_{(a+b)}=0.044''$ for a 50° F. temperature change for a total out of focus of 0.088" over the specified range. With an $f/20$ optical system this represents a $\pm 0.002''$ or $\pm 50$ micron emission line broadening at the exit slit. This line broadening represents a major energy loss and is graphically illustrated in FIG. 2 where a focused condition is indicated by the curve 32 superimposed on an exit slit 16 and a defocused curve 34 superimposed over both.

In accordance with the present invention focusing is maintained by keeping a constant path length between the entrance and exit slits. That is to say the distances $L_a$ and $L_b$ in FIG. 1 remain constant regardless of whether the housing 10 contracts into the exaggerated dotted line condition 10' of FIG. 1 or expands into the dotted line condition 10'' of FIG. 1. Focusing of the system is maintained over changing temperature conditions by taking advantage of the differential expansion of two different materials.

Figure 3:
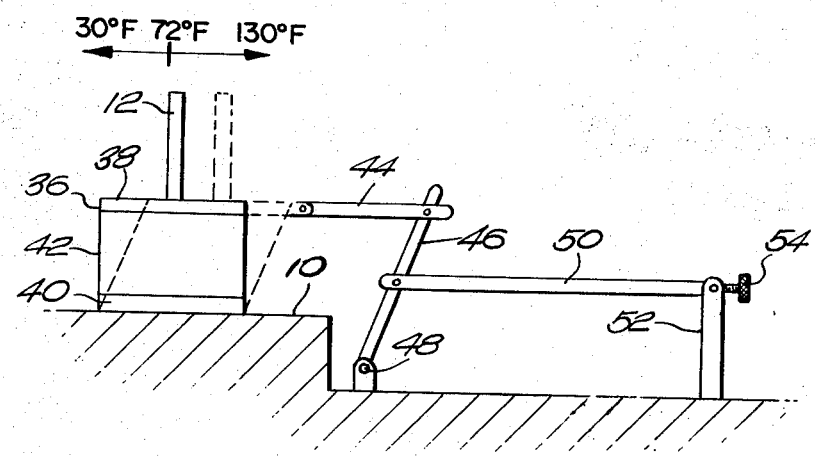
FIG. 3 is a view in side elevation, somewhat diagrammatic of a temperature compensating device for maintaining focus under changing temperature conditions, and, FIG. 4 is a somewhat schematic perspective and diagrammatic view of an optical spectrometer embodying the invention.

As shown in FIG. 3 the system for maintaining the instrument in focus includes a parallelogramming mount 36 for the exit slit 12. This mount is comprised of upper and lower parallel plates 38 and 40 respectively connected by parallel side-walls 42 preferably of a thin walled metal material so as to permit the upper plate 38 to be displaced with respect to the lower plate 40. The lower plate 40 is fixed to the housing 10. The upper plate 38 is pivotally connected to a rod 44 which in turn is pivotally connected to the upper end of a primary lever 46. The lever 46 is pivotally connected at 48 to the housing 10 and extends generally perpendicularly to the connecting rod 44. A relatively long rod 50 parallel to the rod 44 is pivotally connected at its left-hand end as viewed in FIG. 3 to the lever 46 at a point between the rod 44 and the pivot point 48. At its opposite end the rod 50 is connected to a post 52 fixed upright to the housing 10. The rod 50 is fabricated from a material having a coefficient of expansion different from that of the housing 10. In practice, the housing 10 may be fabricated of aluminum A356 and the rod 50 fabricated from a material known as Invar which has a coefficient of thermal expansion close to zero.

The system disclosed in FIG. 3 will cause displacement of the slit 12 to the right upon an increase in temperature and to the left upon a decrease in temperature. This result is achieved by the fact that housing 10 will expand from an increase in temperature more than the rod 50. This will cause the primary lever 46 to pivot about point 48 pulling the plate 38 and its slit 12 to the right as viewed in FIG. 3. Similarly, upon a decrease in temperature the housing will shrink more than the rod 50, pivoting the lever 46 counterclockwise and pushing the plate 38 and slit 12 to the left. This horizontal motion produced by the rod and lever is amplified by a factor of approximately two in the illustrated embodiment by reason of the selected connecting points between the rods 44 and 50 to the lever 46. Obviously the amplification factor may be altered by changing the length of the lever and the pivot points for the rods. The rod 50 is provided with a screw adjust 54 to permit fine adjustment of the system after its installation.

With the foregoing system, the exit slit will be moved along the optical path in relation to the housing upon a change in ambient temperature conditions. The distance and direction of slit movement being determined by the extent of the temperature change and whether it is an increase or decrease. The system may be employed using a variety of different materials it being necessary only that there be a difference in the expansion characteristics between the rod 50 and the housing 10. The system thus provides an automatic temperature compensating servo arrangement in which the optical distance between the entrance slit, the grating and the exit slit remains constant through changing temperatures. In utilizing the system consideration must be given to the expansion characteristics of the materials employed with appropriate changes to the amplification factor in the lever arrangement to insure that the slit is moved at the proper rate.

While the invention has been described in connection with the entrance slit of a Rowland circle spectrometer this has only been for illustration purposes and obviously it may also be used to advantage in other applications wherein critical distances are affected by changing temperature conditions.

Having thus described the invention what I claim and desire to obtain by Letters Patent of the United States is:

1. In an optical spectrometer having a housing, an entrance slit, a grating and at least one exit slit, a device for maintaining a constant optical path length from said entrance slit to said grating and to said exit slit, comprising
   (a) first means supporting at least one of said slits for movement along the optical axis of said spectrometer, the other of said slits mounted to said housing,
   (b) a lever pivoted to said housing,
   (c) second means connecting said first means to said lever, and
   (d) a member having a coefficient of thermal expansion different from that of said housing fixed at one portion to said housing and at another portion of said lever whereby said lever will pivot and said slit supported by said first means will be displaced along said axis upon a change in ambient temperature.

2. An optical spectrometer according to claim 1 wherein said first means includes a pair of spaced parallel plates one of which is fixed to said housing and the other is fixed to said second means, and a pair of spaced parallel walls connecting said plates and perpendicular thereto.

3. An optical spectrometer according to claim 2 wherein said second means is a first rod parallel to said plates and connected to the other of said plates and to said lever.

4. An optical spectrometer according to claim 3 wherein said member is second rod parallel to said first rod.

5. In a spectrometer having a housing, an entrance slit, a grating and at least one exit slit, a device for maintaining a constant optical path length from said entrance slit to said grating and to said exit slit, comprising
   (a) means supporting at least one of said slits for movement along the optical axis of said spectrometer, the other of said slits is mounted to said housing, and
   (b) a member having a coefficient of thermal expansion different from said housing fixed at one end to said housing and at another end drivingly connected to said support means whereby said slit will be displaced along said axis upon a change in ambient temperature.

References Cited

UNITED STATES PATENTS

| | | | |
|---|---|---|---|
| 1,325,936 | 12/1919 | Fouasse | 350—253 |
| 3,064,520 | 11/1962 | Saunderson et al. | 356—80 |
| 3,329,060 | 7/1967 | Holleran | 350—253 |
| 3,430,056 | 2/1969 | Pfeifer | 250—226 |

RONALD L. WIBERT, Primary Examiner

V. P. McGRAW, Assistant Examiner

U.S. Cl. X.R.

356—79, 256